(12) United States Patent
Bratkovski et al.

(10) Patent No.: US 8,620,843 B2
(45) Date of Patent: Dec. 31, 2013

(54) PATTERN RECOGNITION USING ACTIVE MEDIA

(75) Inventors: Alexandre M. Bratkovski, Mountain View, CA (US); Viatcheslav Osipov, Mountain View, CA (US); Ekaterina V. Ponizovskaya Devine, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 837 days.

(21) Appl. No.: 12/697,198

(22) Filed: Jan. 29, 2010

(65) Prior Publication Data

US 2011/0188755 A1  Aug. 4, 2011

(51) Int. Cl.
*G06F 15/18* (2006.01)
(52) U.S. Cl.
USPC .............................. 706/20; 706/45; 372/43.01
(58) Field of Classification Search
USPC ................... 706/20, 45; 372/43.01
See application file for complete search history.

(56) References Cited

U.S. PATENT DOCUMENTS 7,397,101 B1 * 7/2008 Masini et al. ............... 257/458

OTHER PUBLICATIONS

Nicholas Rambidi ("Biologically Inspired Information Processing Technologies: Reaction-Diffusion Paradigm" 2004).*

Meixner et al. ("Fronts in a bistable medium with two global constraints: Oscillatory instability and large-amplitude limit-cycle motion" 1998).*
F. Sapuppo, et al., "A cellular nonlinear network: real-time technology for the analysis of microfluidic phenomena in blood vessels", Institute of Physics Publishing Nanotechnology 17 (2006) S54-S63.
O. Turel, et al., "Neuromorphic architectures for nanoelectronic circuits", International Journal of Circuit Theory and Applications, Int. J. Circ. Theor. Appl. 2004; 32:277-302.
H. Ando, et al., "Image Segmentation/Extraction Using Nonlinear Cellular Networks and Their VLSI Implementation Using Pulse-Modulation Techniques", IEICE Trans. Fundamentals, vol. E85-A, No. 2, Feb. 2002, pp. 381-388.
G. Sapiro, "Geometric Partial Differential Equations and Image Analysis", University of Minnesota Short Course on Mathematical Methods in Speech and Image Analysis, Institute of Mathematics and It's Applications University of Minnesota, Sep. 14, 2000, 9 pages.
C. B. Muratov, et al., "Scenarios of domain pattern formation in a reaction-diffusion system", The American Physical Society, Physical Review E, vol. 54, No. 5, Nov. 1996, 20 pages.
C. B. Muratov, et al., "General theory of instabilities for patterns with sharp interfaces in reaction-diffusion systems", The American Physical Society, Physical Review E, vol. 53, No. 4, Nov. 1996, 17 pages.
M. Seul, et al., "Domain Shapes and Patterns: The Phenomenology of Modulated Phases", Science * vol. 267 * Jan. 27, 1995.
M. Bode, et al., "Pattern formation in reaction-diffusion systems—dissipative solitons in physical systems", Physica D 86 (1995) 53-63.

(Continued)

*Primary Examiner* — Lut Wong

(57) ABSTRACT

A pattern recognition system includes an active media, an input system, and a sensing system. The active media is such that initial states respectively evolve over time to distinguishable final states. The input system establishes in the active media in an initial state corresponding to an input pattern, and the sensing system measures the media at separated locations to identify of which of the final states the media has after an evolution time. The identification of the final state indicates a feature of the input pattern.

19 Claims, 5 Drawing Sheets

(56) References Cited

OTHER PUBLICATIONS

M. C. Cross, et al., "Pattern formation outside of equilibrium", Reviews of Modern Physics, vol. 65, No. 3, Jul. 1993, 273 pages.
T. Roska, et al., "Cellular Neural Networks With Non-Linear and Delay-Type Template Elements and Non-Uniform Grids", International Journal of Circuit Theory and Applications, vol. 20, 469-481 (1992) 13 pages.
W. Kinzel, Spin Glasses as Model Systems for Neural Networks/Complex Systems—Operational Approach in Neurobiology, Physics and Computers: Proc. of the Intern. Symposium on Synergetics at Schlofi Elmau, FRG, May 6-11, 1985.
W. Kinzel, "Remanent magnetization of the infinite-range Ising spin glass", Physical Review B, vol. 33, No. 7, Apr. 1, 1986, 3 pages.
Cross, et al., "Pattern formation outside of equilibrium", Reviews of Modern Physics, 273 pp., vol. 65, No. 3, The American Physical Society, Jul. 1993.

* cited by examiner

PATTERN RECOGNITION USING ACTIVE MEDIA

BACKGROUND

Digital computers commonly employ image processing techniques such as image digitizing, segmentation, magnitude gradient determination, and topological skeletonization techniques in order to recognize patterns represented in the images. With these techniques, a current digital computer executing suitable software can perform many pattern recognition tasks such as character recognition. However, the more general pattern recognition capabilities such as provided by the human brain can be difficult to replicate on digital computers because of bandwidth and connectivity issues that command astronomical quantities of digital resources. In particular, current digital computer architectures might require 5 to 7 orders of magnitude times the processing power of a human brain to approach the general pattern recognition abilities of the average human. This disparity in abilities is sometimes used to distinguish between human and automated users of websites and other systems. In particular, a web page or other software can request that a user enter words from an image containing text that is distorted. A human can often recognize the pattern of the distorted text even when the distortion is beyond the recognition capabilities of standard character recognition software.

Cellular neural networks (CNN) and neuromorphic networks have been suggested for image processing and pattern recognition systems. These network systems can potentially provide significant improvements in automated pattern recognition, but the systems are generally complex. Further, some proposed neural networks require molecular electronic elements or nanometer scale devices that cannot currently be produced. In view of the limitations of current pattern recognition systems and processes and the complexity of proposed pattern recognition systems, new approaches may be needed.

BRIEF DESCRIPTION OF THE DRAWINGS

Use of the same reference symbols in different figures indicates similar or identical items.

DETAILED DESCRIPTION

Figure 1A:
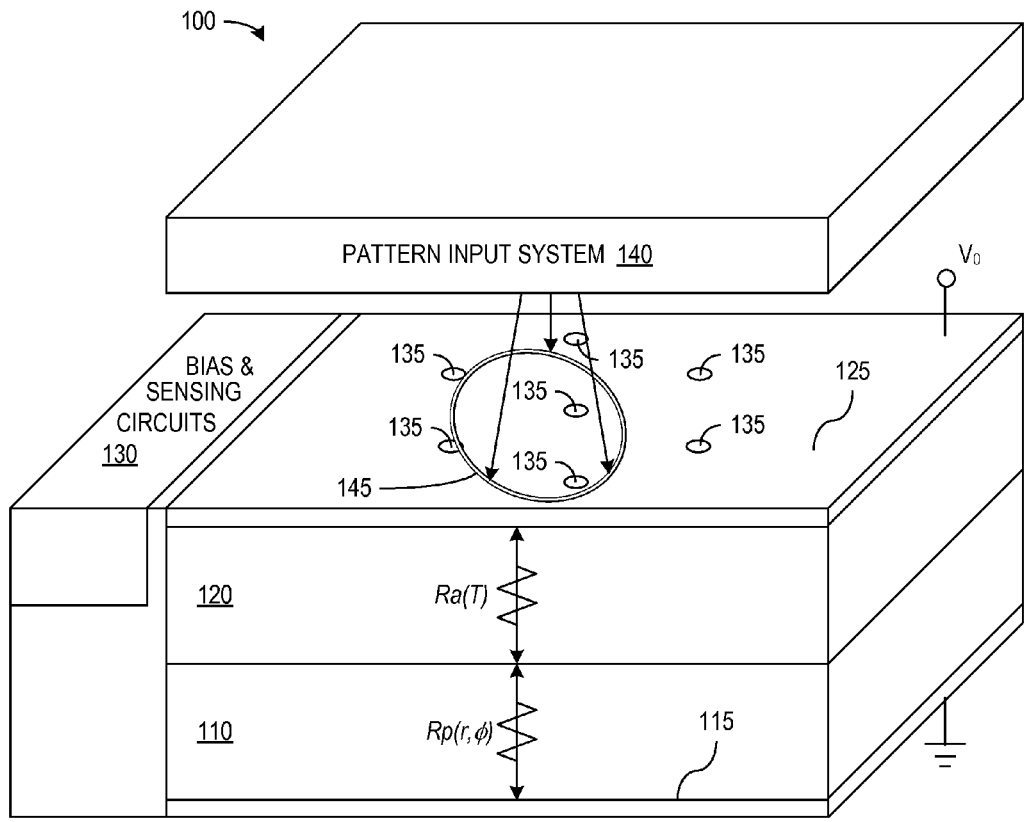
FIGS. 1A and 1B show alternative embodiments of feature detectors including an active distributed media in accordance with an embodiment of the invention.

In accordance with an aspect of the invention, an active distributed media or system can be used to recognize or detect pattern features by evolving an initial state corresponding to a pattern to be recognized into one of a set of distinguishable final states. A feature of the pattern can then be determined according to which of the final states results from the initial state. Additionally, active distributed systems can be designed or programmed to detect different features by having different final states that distinguish different features or properties of initial patterns, and multiple feature detectors containing such active distributed systems can be used in parallel or in series for pattern recognition through evaluation of multiple detected features of an initial pattern.

Many physical, chemical, and biological non-equilibrium active distributed systems (ADSs) possess fascinating pattern formation and self-organization properties. In some cases, a final or steady state pattern can be reached in an ADS by allowing an initial state pattern to evolve for a suitable period of time. The final state in general depends on the initial state and the properties of the ADS. For example, the growth of a forest fire depends on the initial boundaries of the forest fire and system parameters such as fuel density, terrain elevation, and weather patterns. Of primary interest here are electronic systems that can evolve from different initial conditions to a discrete set of types of steady states or more generally a discrete set of "final" states.

A mathematical model, which describes the phenomenology of evolution in many ADSs, includes a pair of the reaction-diffusion differential equations of the activator-inhibitor type such as shown in Equations 1. In Equations 1, functions $\theta$ and $\eta$ can represent physical quantities (e.g., electrical current density and voltage drop) that evolve in time t and vary spatially across a distributed system. Quantity $\theta$ is referred to herein as the 'activator', and quantity $\eta$ is referred to as the 'inhibitor'. In Equations 1, parameters l and L indicate the characteristic length scales, and parameters $\tau_\theta$ and $\tau_\eta$ reflect the characteristic time scales for activator $\theta$ and inhibitor $\eta$, respectively. Functions q and Q are generally nonlinear functions of activator $\theta$, inhibitor $\eta$, and system parameters $A_i$. Equations 1 have been used extensively to study various non-equilibrium systems. In particular, Equations 1 can describe different semiconductor, superconductor, and gas-discharge structures, electron-hole, and gas plasma systems, and also systems with uniformly generated combustion material, and chemical reactions with autocatalysis and cross catalysis.

$$\tau_\theta \frac{\partial \theta}{\partial t} = l^2 \nabla^2 \theta - q(\theta, \eta, A_i)$$

$$\tau_\eta \frac{\partial \eta}{\partial t} = L^2 \nabla^2 \eta - Q(\theta, \eta, A_i)$$

Equations 1

Evolution of activator θ and inhibitor η in an ADS that is modeled by Equations 1 is associated with a positive feedback of activator θ. This process is controlled by inhibitor η, which suppresses the indefinite growth of activator θ. Competition between these two processes gives rise to different kinds of patterns of evolution of the variations in activator θ and inhibitor η. In particular, activator θ and inhibitor η can evolve through time to reach a steady state, where both quantities stop varying with time. Activator θ or inhibitor η may be measured to determine whether activator θ or inhibitor η has reached a particular steady state or a "final" state, which strictly speaking may not be a stationary, steady state.

Active distributed systems having measurable properties θ and η that evolve, e.g., according to Equations 1 or in other predictable manners, can be employed for pattern recognition in accordance with an embodiment of the invention. FIG. 1A, for example, shows a simple active distributed system 100 that can be built using integrated circuit fabrication techniques. ADS 100 includes a substrate containing a passive layer 110 in electrical contact with an active layer 120. Layers 110 and 120 are distributed in that layers 110 and 120 have an area across which a pattern to be recognized can be established. Biasing and sensing circuits 130 and a pattern input system 140 can optionally be fabricated in the same integrated circuit chip with layers 110 and 120 or fabricated as separate components that are coupled to active layer 120 as described further below.

Active layer 120 is constructed to create an active distributed media in which coupled physical quantities evolve, for example, in the manner modeled by Equations 1. The physical quantities and the nature of their coupling depend on the specifics of active distributed media, but preferably, at least one of the quantities is an electrical property such as current or current density that can be measured using well known circuit elements in sensing circuits 130. In an exemplary embodiment, current density J is the activator, and active layer 120 has an S-like current-voltage (I-V) characteristic. In particular, the I-V characteristic of active layer 120 is such that two different currents that could result from the same voltage drop across active layer 120. Active layers with S-shaped or Σ-shaped I-V curves that can be approximated using a polynomial (e.g., a cubic polynomial) for function q in Equation 1. An S-shaped or E-shaped I-V curve generally has extrema (maxima or minima) that provide positive feedback that tends to push initial current-voltage distributions to particular final state distributions. Several semiconductor devices including thyristors, which are p-n-p-n structures, and thermistors, which have resistances that vary with temperature, have suitable I-V characteristics.

Figure 1B:
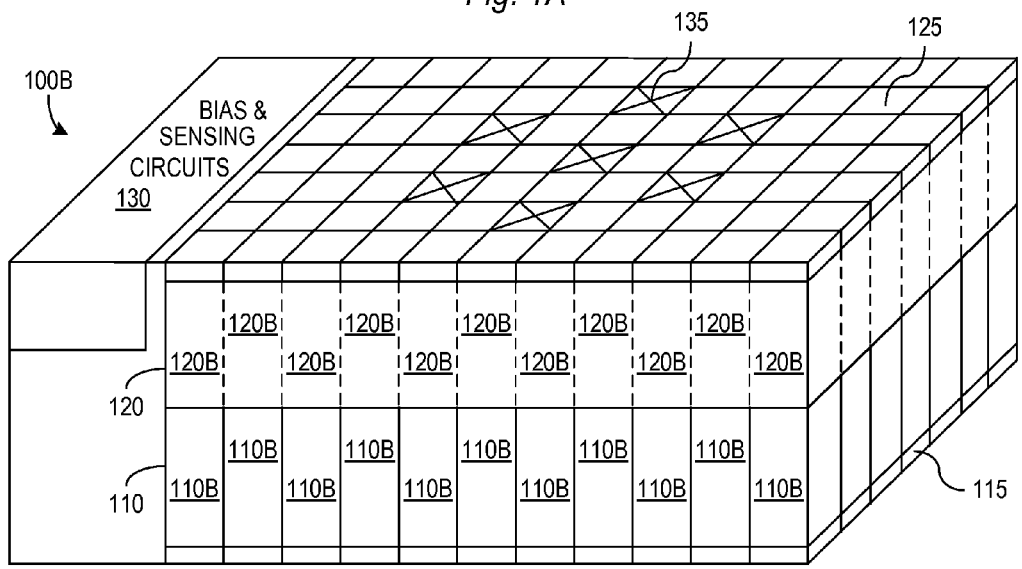

Layer 110 is constructed to provide a resistance Rp per area of layer 110 between a bottom electrode 115 to the interface with active layer 120 that varies across the area of ADS 100 as a function Rp(x,y) or Rp(r,φ), where x and y are rectangular coordinates and r and φ are polar coordinates for the area of layer 110. (In some embodiments of the invention, the passive resistance Rp is radially symmetric and does not depend on angular co-ordinate φ.) Per-area resistance Rp can be continuous. In which case, the desired variation and functional dependence of resistance Rp can be created by varying the thickness or the chemical composition (e.g., doping concentration) of passive layer 110. Alternatively, as shown in FIG. 1B, passive layer 110 can include an array of discrete devices 110B such as transistors or floating gate devices that are operated to effectively produce the desired variation in per-area resistance Rp. Discrete devices 110B in passive layer 110 may further permit changing the per-area resistance Rp in order to use the same feature detector 100 to recognize different pattern features using the techniques further described below. In an exemplary embodiment of feature detector 100 of FIG. 1A, which is presumed in the following, passive layer 110 is a doped layer of silicon having a dopant concentration of a thickness that varies in a pattern across the resistance layer of ADS 110.

Active layer 120 can similarly be a continuous layer as shown in FIG. 1A or an array of discrete devices 120B (FIG. 1B) such as thyristors or thermistors that are interconnected or positioned to provide the desired coupling of activator θ and inhibitor η. In particular, discrete devices 120B may be thermally coupled together, so that heat flows between devices 120B and the temperature distribution of active layer 120, even when made up of discrete devices 120B, and can reach a steady state. In the exemplary embodiment, which is described in more detail here to provide a concrete example of an embodiment of the invention, active layer 120 is a uniform layer of thermistor material such as intrinsic silicon, and activator θ and inhibitor η are respectively current density J and voltage drop V in the active layer 120. Intrinsic silicon is a negative temperature coefficient thermistor material and therefore has a conductivity a that increases with the temperature. The conductivity of a negative temperature coefficient thermistor as a function of temperature can typically be modeled as $\sigma(T) = \sigma_0 \exp(-\Delta/kT)$, where $\sigma_0$ is a constant having units of conductivity, Δ is an activation energy (e.g., Δ=1.12 eV for intrinsic silicon), and k is the Bolzmann constant. Thus, conductivity σ(T) rises (or equivalently the resistivity drops) with increasing temperature in active layer 120 of the exemplary embodiment of the invention. Intrinsic silicon layers tend to develop filaments of current corresponding to the well-known breakdown phenomenon, but in system 100, the breakdown is desired and controlled, rather than being destructive.

A resistance Ra(T) per area between a top electrode 125 and the interface of active layer 120 with passive layer 110 depends on the temperature of active layer 120 at each point in active layer 120. Per-area resistance Ra(T) varies with position only through the variation of the temperature with position. In contrast, per-area resistance Rp(r,φ) of passive layer 110 is designed to vary with position even when the temperature is uniform, and per-area resistance Rp(r,φ) preferably has less temperature dependence than does active layer 120 over the range of operating temperatures of ADS 100. In an alternative ADS, the fixed spatial variations and variations in the activator or inhibitor may be provided in a single layer.

Inhomogeneous distribution of a parameter A(r) in passive layer 110 can be created using a thickness inhomogeneity in passive layer 110. For example, a depression in the top or bottom surface of passive layer 110, where the surface follows the shape 230 of a spatial distribution A(r) shown in FIG. 2, will produce spatially varying local resistance Rp(r,φ) in passive layer 110 with extrema (local minima) in regions 210 and 220. In other words, the spatial variation in system parameters of an ADM can be achieved by varying thickness of passive layer 110. Alternatively, spatial variation in the doping concentration in layer 110 can achieve the same variations in resistance Rp(r,φ). Further, since the resistance of semiconductor material depends on temperature, the same spatially varying distribution of Rp(r,φ) can be achieved by placing and operating a set of heating elements (e.g., metallic strips) having an appropriate shape. Those elements can be addressed by a set of entry points for current to form required heated pattern that mimics the desired variations. A desired resistance profile $Rp(r,\phi)$ may alternatively be created using laser heating, or using an array of discrete devices 110B as shown in FIG. 1B with characteristics programmed to achieve the desired profile $Rp(r,\phi)$.

In the exemplary embodiment of feature detector 100 of FIG. 1A, the current density $J(r,\phi)$ in active layer 120 is the activator, and the voltage drop $V(r,\phi)$ from the top surface of active layer 120 to the interface with passive layer 110 is the inhibitor. The current density $J(r,\phi)$ and voltage drop $V(r,\phi)$ satisfy evolution equations that can be derived from a thermal energy balance equation and the relation of current density to conductivity and temperature. In particular, assuming a thermal equilibrium of active layer 120 with its surroundings, the time derivative of resistance $Ra(r,\phi)$ and temperature T at a point in active layer 120 depends on the heat flow, which is proportional to the Laplacian of temperature T, and on the electrical heating, which depends on the current density J at the point. The time derivative of current density J and voltage V can further be described using Maxwell's equations, and the voltage drop across active layer 120 at a point $(r,\phi)$ in turn depends on per-area resistance $Rp(r,\phi)$ in passive layer 110 when bias and sensing circuits 130 applies a voltage $V_0$ across active layer 120 and passive layer 110 in series.

ADS 100 can act as a feature detector capable of detecting a feature in a pattern that is represented by an initial state of thermal or current variations in active layer 120. Feature detection generally includes establishing the initial state in ADS 100, allowing the state of ADS 100 to evolve, and measuring the evolved state of ADS 100. To establish the initial state of ADS 100, pattern input system 140 heats a portion 145 of active layer 120, so that heated portion 145 has a shape corresponding to the pattern to be processed or recognized. Pattern input system 140 may, for example, receive a digital representation of a black-and-white or grayscale image and heat areas of active layer 120 according to corresponding pixel values of the digital image representation. In the exemplary embodiment of feature detector 100, active layer 120 is high resistance or intrinsic silicon, which is a highly photosensitive material, and pattern input system 140 can include a laser or other light source in a projection system that heats active layer 120 optically by scanning or projecting onto active layer 120 a suitable light pattern. Alternatively, pattern input system 140 can heat active layer 120 electrically using an array of resistive heating elements or by driving controlled pattern of current into active layer 140 through selected elements of an array of electrodes that may collectively form top electrode 125 as shown in FIG. 1B.

Figure 2:
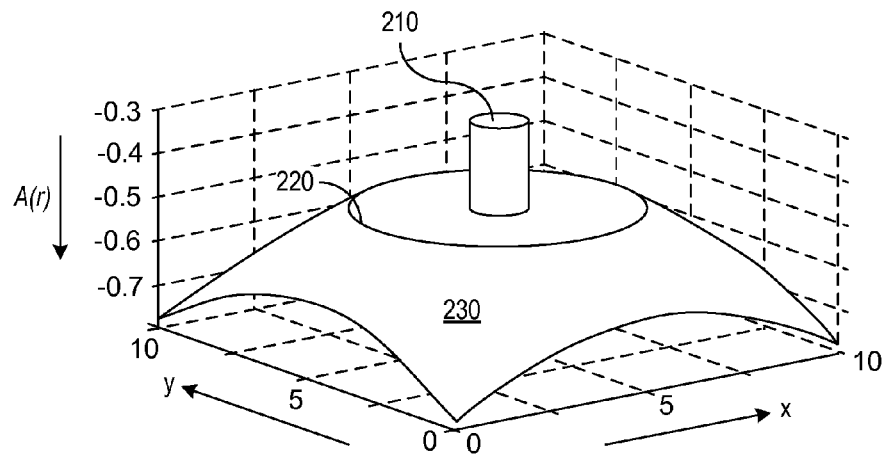
FIG. 2 illustrates a system parameter variation that provides an active distributed media with final states that are distinguishable and provide information concerning the pattern of an initial state of the active distributed media.

FIG. 1A shows heated portion 145 as being generally shaped like the letter "O", but heated portion 145 can have any pattern to be recognized. Preferably, the size and location of the heated portion 145 can be normalized to roughly match the arrangement of sensing regions 135 or the area of active layer 120. When a bias voltage $V_0$ is applied between top electrode 125 and bottom electrode 115, a total electrical current I will flow through layers 120 and 110 with a greatest concentration of current density J in active layer 120 being through a low resistance path corresponding to heated portion 145. The initial current pattern will subsequently evolve according to the properties of ADS 100 and particularly according to variation of per-area resistance Rp in passive layer 110. In general, as heat flow changes the variation of temperature T in active layer 120, the peak of current density J in active layer 120 will move toward the areas of passive layer 110 that have lower per-area resistance Rp. For example, FIG. 2 shows a plot 200 of per-area resistance Rp in an embodiment having a central minimum 210 separated from and surrounded by a circular ring-shaped minimum 220. The slope or change in per-area resistance Rp tends to move current density J in active layer 120 from the initial state corresponding to heated area 145 toward areas of lower per-area resistance Rp until current density J is greatest over local resistance minima 210 or 220. States in which current density J is concentrated over minima 210 or 220 form a family of final states that are distinguishable by the particular locations of maximum current density. Sensing regions 135 can be positioned for measurements that distinguish between different final states.

Figure 3A:
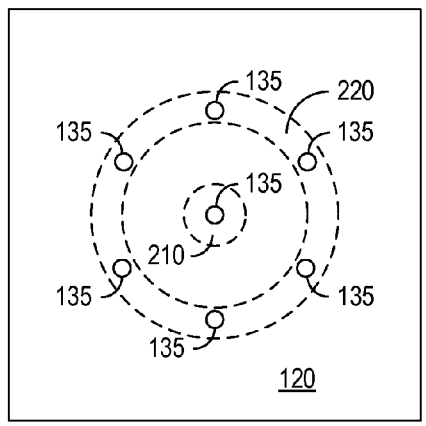
FIG. 3A shows the placement of sensing regions relative to extrema in the variation of a system parameter of a feature detector in accordance with an embodiment of the invention.

FIG. 3A illustrates how sensing regions 135 can be positioned to perform measurements indicating current density J or temperature T at selected locations above minima 210 and 220 of the per-area resistance Rp shown in FIG. 2. In one embodiment, sensing regions 135 can simply be electrically conductive regions that are biased the same as top electrode 125 but electrically isolated from top electrode 125. Current measuring circuits in biasing and sensing circuits 130 can then be connected to measure the separate currents flowing through respective sensing regions 135 and optionally to measure the current flowing through electrode 115 or 125. Alternatively, thermal sensors or other devices could be incorporated in sensing regions 135 to sense either the local temperatures or current densities. The particular configuration illustrated includes a central sensing region 135 over central minima 210 and six sensing regions 135 arranged above circular ring-shaped minima 220, but other configurations using more or fewer sensing areas are possible.

Figure 3B:
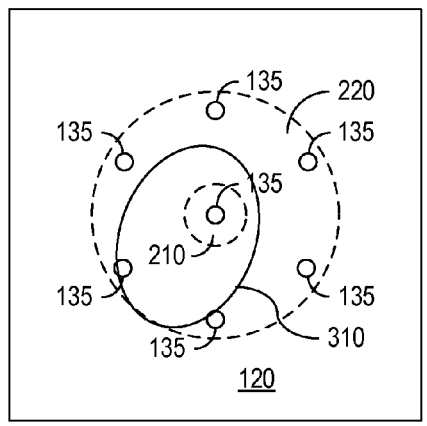
FIGS. 3B, 3C, and 3D illustrate the evolution of an initial state having a generally O-shaped pattern to a final state in an active distributed media in accordance with an embodiment of the invention corresponding to FIG. 3A.
Figure 3C:
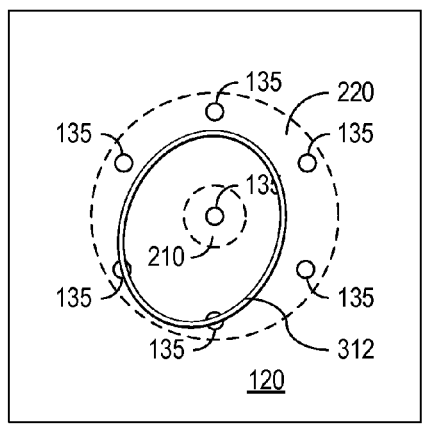
Figure 3D:
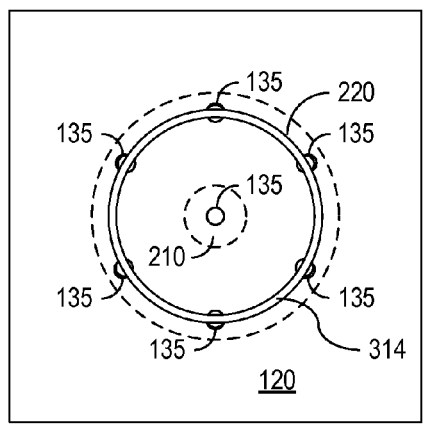

FIGS. 3B, 3C, and 3D illustrate evolution of the state of active layer 120 during feature detection. FIG. 3B particularly shows an initial state where current density J is high in a generally O-shaped region 310 of active region 120, for example, as a result of pattern input system 140 heating region 310 to a temperature that significantly reduces resistance Ra in region 310 of active layer 110. Operation of electrical heating caused by current density J, thermal flow in active layer 120, and Maxwell's equation causes the peak current density in active layer 110 to evolve and move toward areas overlying lower per-area resistance Rp in passive layer 110. FIG. 3C shows a region 312 of high current density that has moved from region 310 of FIG. 3B and finally settles in region 314 as shown in FIG. 3D. The time required for the active distributed system to evolve from an initial state to a final state will generally depend on system parameters such as the resistivities, thermal conductivity, and heat capacity of materials employed, but may be as short as 10 ns or less. In the final state of FIG. 3D, sensing regions 135 over minima 220 will all sense significant current density, but the sensing region 135 over central minima 210 will not. (Whether current is significant or not can be determined through comparison of measured current in a sensing region 135 to a fixed threshold, to measured currents in other sensing regions 135, or a measured current through top or bottom electrode 125 or 115.) A final state of ADS 100 causing all sensing regions 135 over minima 220 to sense significant current density and the sensing region 135 over central minima 210 to sense little or no current can be associated with a pattern having an O-like shape.

Figure 3E:
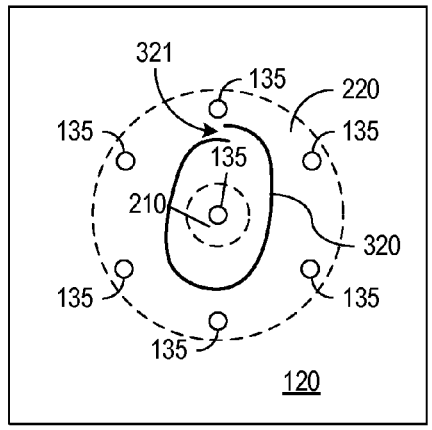
FIGS. 3E, 3F, and 3G illustrate how the active distributed media of FIG. 3A causes an initial state having a pattern that is generally O-shaped with a small break to evolve into a final state characteristic of an O-shape.
Figure 3F:
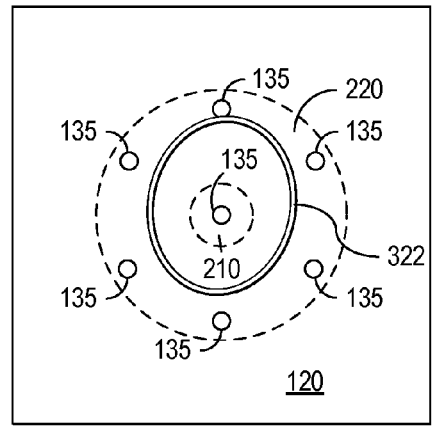
Figure 3G:
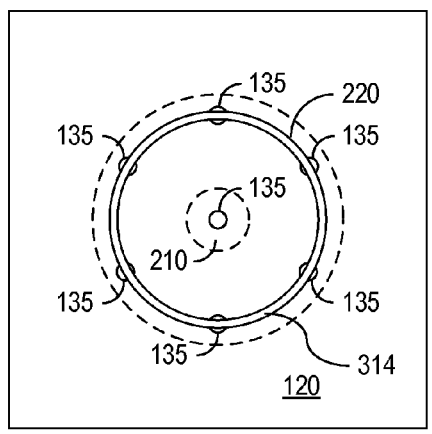

FIGS. 3E, 3F, and 3G illustrate that a pattern that is generally O-shaped but that has a small break can also be recognized as having the O-like feature. In particular, FIG. 3E illustrates an initial state in which a high current density is established in a region 320 of active layer 120, where region 320 includes a small break 321 between ends. Evolution of the high current density region can close the break as shown in FIG. 3F and will eventually arrive at the final state 314 as shown in FIG. 3G. The final state in FIG. 3G is the same as the final state of FIG. 3D. Accordingly, the initial patterns of both regions 310 and 320 can be recognized as being O-shaped through measurements detecting final state 314.

Figure 3H:
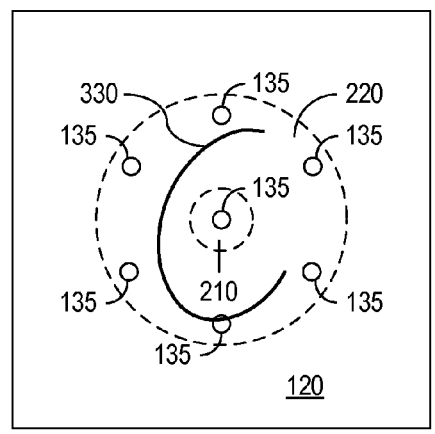
FIGS. 3H, 3I, and 3J illustrate how the active distributed media of FIG. 3A causes a generally C-shaped pattern to evolve to a final state that is distinguishable from the final state characteristic of an O-shape.
Figure 3I:
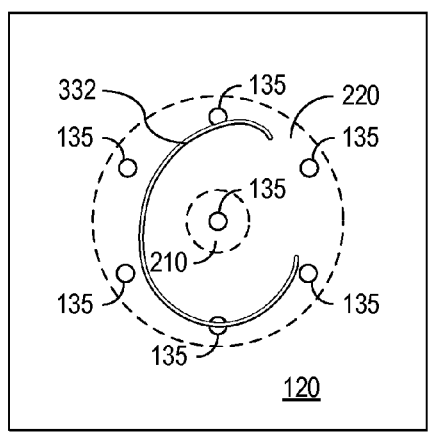
Figure 3J:
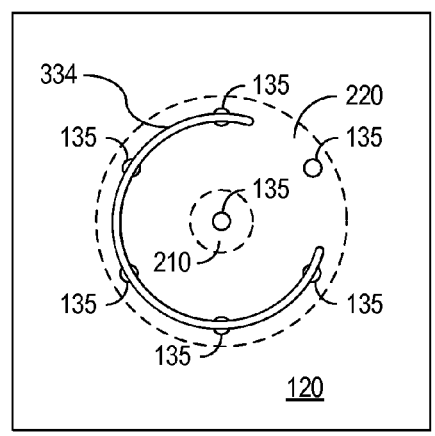

FIGS. 3H, 3I, and 3J illustrated a process that recognizes a C-shape. A C-shape generally has a much larger break or separation of end points than does an O-shape that doesn't close. FIG. 3H shows an initial region 330 of high current that can be established by heating of region 320 before applying a bias voltage. The high-current regions evolves as high currents move toward minimum 220 as shown by region 332 in FIG. 3I, but the ends of the high current region do not close on each other. As a result a final shape 334 reached in FIG. 3J does not extend to all of the sensing regions 135 over minima 220. Final state 334 can be distinguished from final state 314 in that fewer than all of the six sensing regions 135 over minima 220 measure significant current. A U-shaped pattern can similarly be distinguished from an O-shaped pattern by the number of sensing regions not measuring significant current density and could be distinguished from a C-shaped region from the location or locations of the sensing regions 135 that do not sense a significant current density in the evolved state.

Figure 3K:
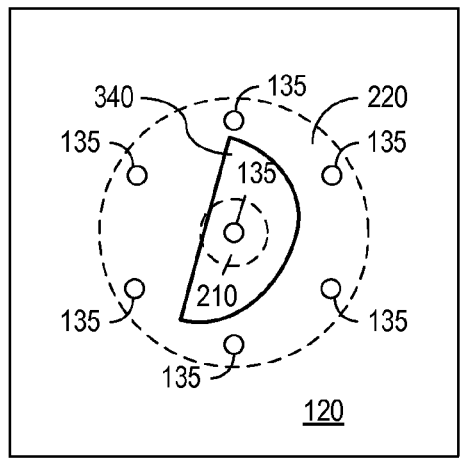
FIGS. 3K, 3L, and 3M illustrate how the active distributed media of FIG. 3A causes a generally D-shaped pattern to evolve to a final state that is distinguishable from the final state characteristic of an O-shape or C-shape.
Figure 3L:
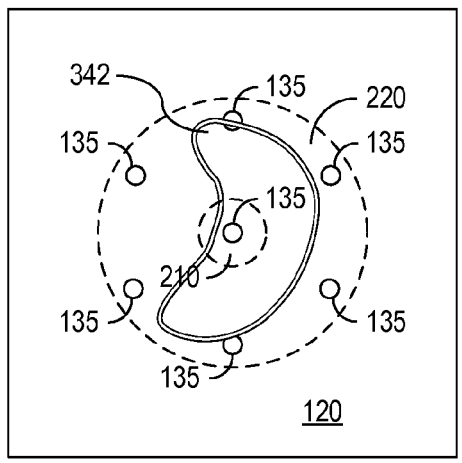
Figure 3M:
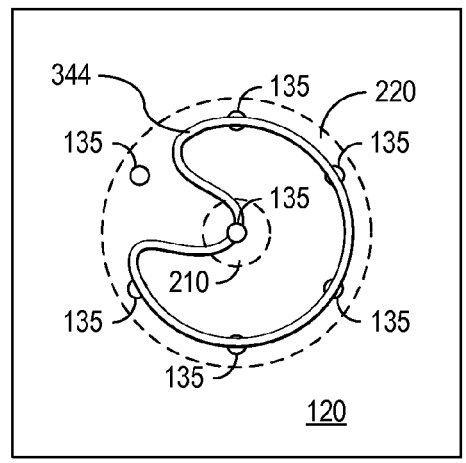

FIGS. 3K, 3L, and 3M illustrate the evolution of an initial region 340 corresponding to a D-shaped pattern. D-shaped region 340 has a straight side with a portion that begins on central minima 210 or at least on a slope of per-area resistance $Rp(r,\phi)$ leading to central minimal 210. Accordingly, the initial state 340 evolves to a state corresponding to a high-current density region 342 of FIG. 3L and then to a final state corresponding to a high-current density region 344 of FIG. 3M, which has a high current density at central minima 210. The D-shape pattern can be distinguished from the O, C, and U-shaped pattern based on the central sensing region 135 sensing a significant current density after the evolution time.

Figure 4A:
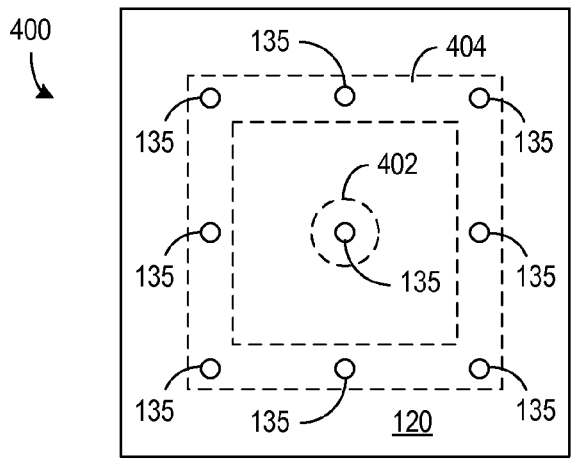
FIG. 4A shows a configuration of sensors or sensing locations relative and extrema in a system parameter of an active distributed media in accordance with another embodiment of the invention.

An active distributed system having a system parameter of the type illustrated in FIG. 2 can at least distinguish letters O, C, U, and D of the Latin alphabet. However, some other shapes will not be distinguishable if the initial states corresponding to different patterns evolve to the same final state. In accordance with an aspect of the invention, many different types of variation of per-area resistance $Rp(r,\phi)$ can be used to better distinguish particular patterns. FIG. 4A, for example, illustrates a feature detector 400 having a system parameter $Rp(r,\phi)$ selected to distinguish patterns corresponding to letters such as F and E. Feature detector 400 can include an active layer 120 and an underlying passive layer that are substantially as described above, except that the passive layer has a per-area resistance $Rp(r,\phi)$ with a central minima 402 surrounded by a rectangular minima 404. Sensing regions 135 are arranged to measure at locations corresponding to the minima 402 and 404 in feature detector 400.

Figure 4B:
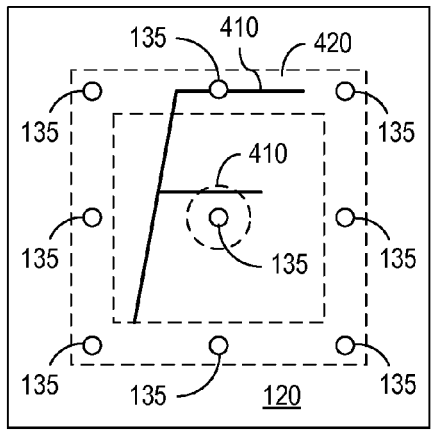
FIGS. 4B and 4C illustrate the evolution of the active distributed media of FIG. 4A from an initial state corresponding to a generally F-shaped pattern to a final state characteristic of an F-shape.
Figure 4C:
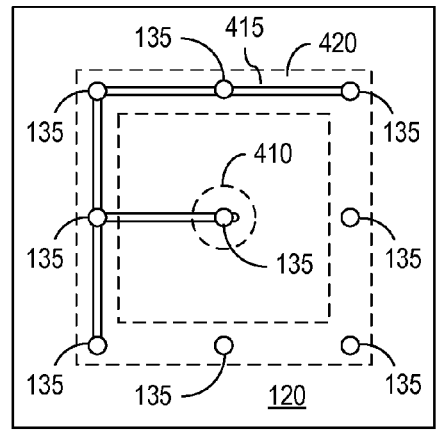
Figure 4D:
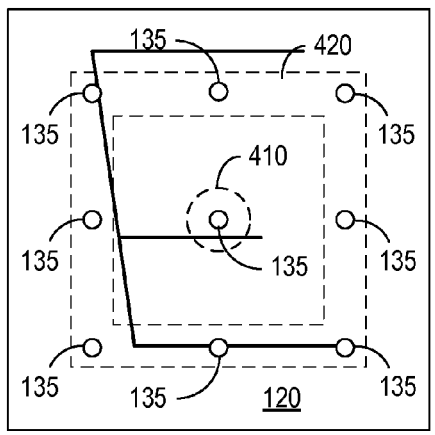
FIGS. 4D and 4E illustrate the evolution of the active distributed media of FIG. 4A from an initial system state corresponding to a generally E-shaped pattern to a final state characteristic of an E-shape.
Figure 4E:
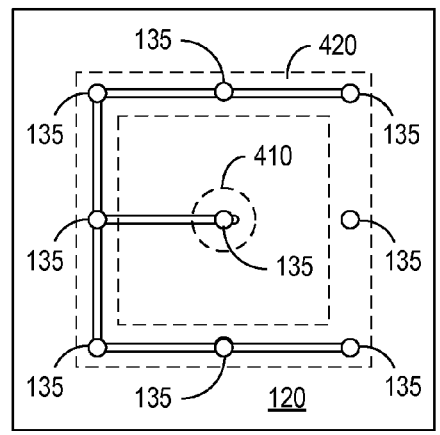

FIGS. 4B and 4C illustrate how an initial state corresponding to a high current region 410 having an F-shape evolves to a final state 415 including high current density at a specific set of sensing regions 135. FIGS. 4D and 4E illustrate how an initial state corresponding to a high current region 420 having an E-shape evolves to a different final state 425 including high current density at a set of sensing regions 135 that differ from the set of sensing regions sensing high current in the state of FIG. 4C. Accordingly, a variation in a system parameter of the type illustrated in FIG. 4A can be used to distinguish an F-shape feature from an E-shape feature.

Figure 5:
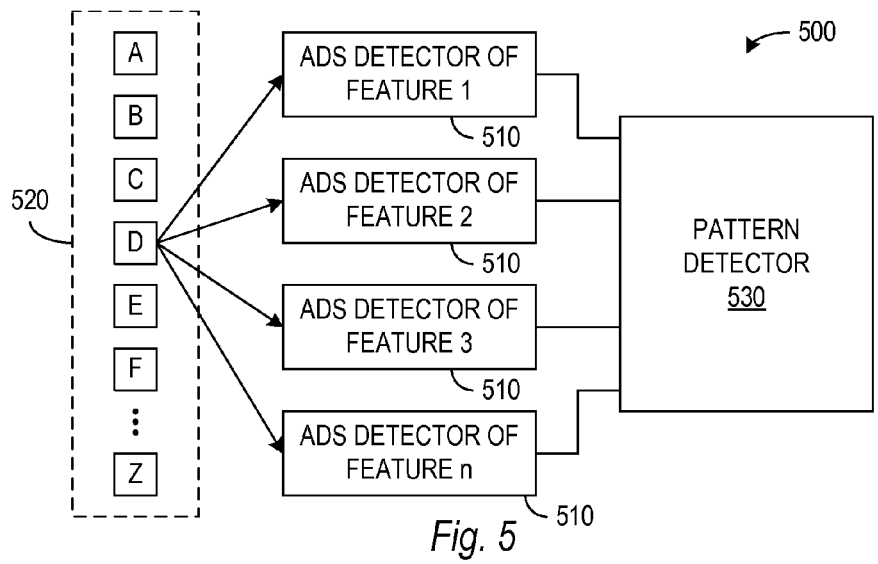
FIG. 5 is a block diagram of a pattern recognition system in accordance with an embodiment of the invention employing multiple feature detectors.

Recognizing letters or recognizing a large set of different pattern types will in general require use of multiple different forms of system parameters such as the different per-area resistances Rp of FIGS. 3A and 4A. FIG. 5 illustrates a system 500 that uses a set of feature detectors 510. Each feature detector 510 is preferably selected to distinguish a different feature of an input pattern. For example, one feature detector 510 may be structurally identical to ADS system 100 and have a passive layer with a per-area resistance Rp with minima as shown in FIG. 3A, while another feature detector 510 is structurally identical to ADS system 100 but has a passive layer with a per-area resistance Rp with minima as shown in FIG. 4A. Alternatively, feature detectors 510 may be structurally identical but discrete devices that are programmed differently to provide different variations in a system parameter that influences state evolution. More generally, feature detectors 510 can have the same or different structures provided that the set of features collectively distinguished by detectors 510 is sufficient to recognize and distinguish any pattern in a target set 520, e.g., the alphabet.

In operation, a target pattern (e.g., a digital representation of the image of a letter) believed to be a member of set 520 is simultaneously input to all feature detectors 510, and the initial states corresponding to the target pattern are established in feature detectors 510. Even though the initial states may be the same in each detector 510, the initial state will evolve differently in each feature detector 510, e.g., because of different per-area resistance Rp in different feature detectors 510. After an evolution time, each feature detector 510 can output a signal indicating the final state that was reached in that detector 510. For example, each detector 510 can output a binary signal indicating which sensing regions in the detector sensed significant current density. Pattern detector logic 530, which can be implemented in hardware or program code executed by a general purpose computer, can use the outputs from feature detectors 510 to identify a member of set 520 as corresponding to the input pattern. The pattern recognition can be based on a simple look-up table indexed by the combined output of feature detectors 510. System 500 can also be used to compare two patterns simply by comparing the output from detectors 510 for the first pattern to the output of detectors 510 for the second pattern. System 500 does not require any complex numerical algorithms, fast numerical data processing, high-speed circuit or complex semiconductor neural systems.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A pattern recognition system comprising:
    an active media having states that respectively evolve over time to a set of final states, wherein the active media has a characteristic that is fixed during an evolution time and varies across an area of the active media, and the final states are distinguishable according to activity in the active media at a plurality of separated locations of extrema in the characteristic;
    an input system coupled to establish in the active media an initial state corresponding to an input pattern; and
    a sensing system coupled to measure the active media at the separated locations to identify which of the final states the active media has after the evolution time, wherein the identification of the final state indicates a feature of the input pattern.

2. The system of claim 1, wherein the active media comprises a first layer of a thermistor material, and the states of the active media correspond to configurations of current density in the thermistor material.

3. The system of claim 2, wherein the active media comprises a second layer having an interface with the first layer, wherein the characteristic that varies is resistance of the second layer and variation in the resistance of the second layer controls which of the states of the active media are the final states.

4. The system of claim 3, further comprising a second active media that comprises:
a third layer of the thermistor material; and
a fourth layer having an interface with the third layer, wherein the fourth layer has a resistance that varies across an area of the interface and variation in the resistance of the fourth layer differs from the variation in the resistance of the second layer.

5. The system of claim 4, wherein:
the second active media has states that respectively evolve over time to a second set of final states, the variation in resistance in the fourth layer determining which of the states of the second active media are the final states;
the input system is coupled to establish in the second active media the initial state corresponding to the input pattern; and
the sensing system is coupled to measure the second active media at separated location to identify which of the final states the second active media has.

6. The system of claim 2, wherein the input system heats a region of the first layer to establish the initial state, the region heated having the shape of the input pattern.

7. The system of claim 6, wherein the input system heats the region of the first layer by projecting light onto the first layer.

8. The system of claim 6, wherein the input system heats the first layer using an array of electrical heating elements.

9. The system of claim 1, wherein the input system receives the input pattern as a representation of an image.

10. The system of claim 1, wherein the sensing system comprises:
a plurality of electrodes on the first layer; and
a current measuring circuit that measures respective currents through the electrodes.

11. The system of claim 1, wherein the active media comprises:
a first layer; and
a second layer with an interface that permits electrical current to flow serially through the first and second layers, and wherein
the states of the active media correspond to configurations of current density in the first layer; and
the characteristic that varies is resistance of the second layer.

12. The system of claim 1, wherein the active media comprises:
a first layer in which distributed activity evolves during the evolution time; and
a second layer having the characteristic that varies across the area of the active media, wherein:
the states of the active media correspond to configurations of activity in the first layer; and
the second layer keeps the characteristic unchanged during the evolution time.

13. The system of claim 1, wherein the active media comprises:
a first layer in which distributed activity evolves during the evolution time; and
a second layer including a plurality of discrete devices operable to control variation of the characteristic across the area of the active media.

14. The system of claim 1, wherein the active media comprises:
a first layer in which distributed activity evolves during the evolution time; and
a second layer of a resistive material having a resistance per area that varies continuously across the area of the active media.

15. The system of claim 1, wherein the final states are steady states and do not further evolve.

16. A pattern recognition system comprising:
a first active media having states that respectively evolve over time to a first set of distinguishable final states;
an input system coupled to establish in the first active media an initial state corresponding to an input pattern;
a sensing system coupled to measure the first active media at separated locations to identify which of the first final states the first active media has after an evolution time, wherein the identification of the first final state indicates a first feature of the input pattern; and
a second active media having states that respectively evolve over time to a set of second final states, wherein:
the input system is coupled to establish in the second active media the initial state corresponding to the input pattern; and
the sensing system is coupled to measure separated locations of the second active media for identification of which of the second final states the second active media has.

17. The system of claim 16, further comprising a pattern detector connected to the sensing system and configured to recognize the input pattern according to the final states identified by the sensing system.

18. The system of claim 16, wherein the identification of the second final state of the second active media indicates a second feature of the input pattern.

19. The system of claim 16, wherein the second final states of the second active media differs from the first final states of the first active media.

* * * * *